United States Patent
Skarp (10) Patent No.: US 8,294,632 B2
(45) Date of Patent: Oct. 23, 2012

(54) ANTENNA INTERFACE CIRCUITS INCLUDING TUNABLE IMPEDANCE MATCHING NETWORKS, ELECTRONIC DEVICES INCORPORATING THE SAME, AND METHODS OF TUNING ANTENNA INTERFACE CIRCUITS

(75) Inventor: Filip Skarp, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 402 days.

(21) Appl. No.: 12/781,864

(22) Filed: May 18, 2010

(65) Prior Publication Data

US 2011/0285603 A1 Nov. 24, 2011

(51) Int. Cl.
*H01Q 1/50* (2006.01)
*H03H 7/40* (2006.01)
(52) U.S. Cl. .................. 343/860; 343/861; 333/17.3
(58) Field of Classification Search .............. 343/850, 343/860, 861; 333/17.3, 33
See application file for complete search history.

(56) References Cited

U.S. PATENT DOCUMENTS

| | | | | |
|---|---|---|---|---|
| 4,485,360 A | * | 11/1984 | Seward | 333/17.3 |
| 5,195,045 A | * | 3/1993 | Keane et al. | 702/107 |
| 5,654,679 A | * | 8/1997 | Mavretic et al. | 333/17.3 |
| 5,842,154 A | * | 11/1998 | Harnett | 702/106 |
| 6,794,951 B2 | * | 9/2004 | Finley | 333/32 |
| 6,946,847 B2 | * | 9/2005 | Nishimori et al. | 324/600 |
| 7,298,091 B2 | * | 11/2007 | Pickard et al. | 315/111.51 |
| 2008/0106350 A1 | | 5/2008 | McKinzie | |

FOREIGN PATENT DOCUMENTS

WO  WO 02/084868 A1  10/2002
WO  WO 2008/129125 A1  10/2008

OTHER PUBLICATIONS

Bowick, Christopher, "What's in an RF Front End?", Newnes (a division of Elsevier), 2008, 2 pages.
European Search Report Corresponding to Application No. 11162309.6; Dated Aug. 17, 2011; 6 pages.

* cited by examiner

*Primary Examiner* — Don Le
(74) *Attorney, Agent, or Firm* — Myers Bigel Sibley & Sajovec (57) ABSTRACT

An antenna interface circuit for a wireless communication device includes a tunable matching circuit that is coupleable to an antenna. The tunable matching circuit includes a variable impedance element having a variable impedance Ztune. The interface circuit further includes a fixed impedance element having a fixed impedance Zmeas, and a switch coupled to the fixed impedance element and configured to controllably switch the fixed impedance element into electrical communication with the tunable matching circuit. Related devices and methods are also disclosed.

20 Claims, 7 Drawing Sheets

ANTENNA INTERFACE CIRCUITS INCLUDING TUNABLE IMPEDANCE MATCHING NETWORKS, ELECTRONIC DEVICES INCORPORATING THE SAME, AND METHODS OF TUNING ANTENNA INTERFACE CIRCUITS

BACKGROUND

Wireless communication devices typically include an antenna to facilitate the transmission and reception of radio frequency (RF) electromagnetic signals. An antenna has a characteristic impedance, or opposition to the flow of electrical energy, based on its design for a given set of certain operating conditions. In order to maximize the transfer of power to and from the antenna, it is desirable to match the impedance of the antenna to the impedance of the circuit that is driving the antenna. Impedance matching networks are well known tools for matching the impedance of a load, such as an antenna, to a source, such as a radio transceiver.

However, the actual impedance presented by an antenna can change as the antenna is being used. For example, the impedance of the antenna can change when it is held in different orientations, or when it is held near an external object, such as a user's head or hand.

The performance of the antenna can also be affected by the operating frequency of the antenna and the mode of operation of the antenna. Furthermore, many wireless terminals can be used in various configurations. For example, wireless mobile telephones may have designs, such as clamshell (flip phone), jackknife and slider configurations that typically include two housings coupled together by a hinge or slide. Such configurations may permit the mobile telephone to operate in an open position or a closed position. Typically, the antenna of the device is oriented in one direction when the device is in the open position and in a different direction when the device is in the closed position.

Similarly, mobile telephones can be used in a handheld talk position in which the telephone is physically held near the user's head, or a handsfree mode in which the mobile telephone is held near the user's body or is even not held by the user at all. Since antennas for wireless devices typically have limited bandwidth and can only be optimized for one use mode (such as for a handheld talk position), it may be difficult to maintain an effective impedance match for the antenna when, for example, the user places a finger over the antenna.

Changing the antenna matching in response to changes in the mode of operation of the device is usually called antenna tuning. Presently, antenna tuning involves switching an impedance matching circuit between two different impedances. Switching the impedance match may be used to change the resonant frequency of the antenna in broad band applications or to compensate the antenna match depending on whether the device is being used in an open or closed position. However, such an approach may not provide adequate flexibility in tuning the antenna match to accommodate different types of changes in the operating environment of the device. Component and filter manufacturers are developing filter banks, component banks and even tunable components, such as micro electrical-mechanical (MEMS) devices, that are aimed at improving the process of antenna tuning.

SUMMARY

A wireless communication device according to some embodiments includes a power coupler coupled to the signal output port of an RF communication unit, and a tunable matching circuit coupled to the power coupler. An antenna may be coupled to the tunable matching circuit. The tunable matching circuit may include a variable impedance element having a variable impedance Ztune. The device further includes a fixed impedance element having a fixed impedance Zmeas, and a switch coupled to the fixed impedance element and configured to controllably switch the fixed impedance element into electrical communication with the power coupler and the tunable matching circuit.

The variable impedance element and/or the fixed impedance element may be coupled in parallel and/or series with the antenna.

When the fixed impedance element is coupled in parallel with the antenna, the switch may be coupled in series with the fixed impedance element. When the fixed impedance element is coupled in series with the antenna, The switch may be coupled in parallel with the fixed impedance element.

The variable impedance element may include a first variable impedance element coupled in parallel with the antenna and a second variable impedance element coupled in series with the antenna.

The RF communication unit may include a transceiver.

The power coupler may include an input port, an output port, a coupled port and an isolated port, forward power may be present at the coupled port and reflected power may be present at the isolated port.

Some embodiments provide methods of tuning an antenna matching circuit in a wireless communication device including an RF communication unit and an antenna. The methods may include measuring first incident power to the antenna and first reflected power from the antenna in response to an output signal applied to the antenna, coupling a fixed impedance element to the antenna, measuring second incident power to the antenna and second reflected power from the fixed impedance element and the antenna in response to an output signal applied to the fixed impedance element and the antenna, and determining an impedance associated with the antenna in response to the first and second incident and reflected power measurements. A variable impedance element may be coupled to the antenna and may have an impedance selected in response to the impedance associated with the antenna.

A combined impedance of the variable impedance element and the antenna present a predetermined output impedance to the RF communication unit.

Determining an impedance associated with the antenna in response to the first and second incident and reflected power measurements may include generating a first reflection coefficient in response to the first incident power and the first reflected power, generating a second reflection coefficient in response to the second incident power and the second reflected power, and determining the impedance associated with the antenna in response to the first and second reflection coefficients.

The impedance associated with the antenna may be calculated according to the following equation:

$$\begin{cases} |\Gamma_1| = \left|\dfrac{Z_L - Z_0}{Z_L + Z_0}\right| = \sqrt{\dfrac{(\mathrm{Re}(Z_L) - \mathrm{Re}(Z_0))^2 + (\mathrm{Im}(Z_L) - \mathrm{Im}(Z_0))^2}{(\mathrm{Re}(Z_L) + \mathrm{Re}(Z_0))^2 + (\mathrm{Im}(Z_L) + \mathrm{Im}(Z_0))^2}} \\ |\Gamma_2| = \left|\dfrac{Z_L \| Z_{meas} - Z_0}{Z_L \| Z_{meas} + Z_0}\right| = \sqrt{\dfrac{(\mathrm{Re}(Z_L \| Z_{meas}) - \mathrm{Re}(Z_0))^2 + (\mathrm{Im}(Z_L \| Z_{meas}) - \mathrm{Im}(Z_0))^2}{(\mathrm{Re}(Z_L \| Z_{meas}) + \mathrm{Re}(Z_0))^2 + (\mathrm{Im}(Z_L \| Z_{meas}) + \mathrm{Im}(Z_0))^2}} \end{cases}$$

where ZL represents the antenna impedance, Z0 represents a characteristic impedance of the RF communication unit, Zmeas represents the impedance of the fixed impedance element, G1 represents the first reflection coefficient and G2 represents the second reflection coefficient.

The methods may further include determining if a previous impedance tuning may be active and responsively deactivating the previous impedance tuning before coupling the variable impedance element to the antenna.

Measuring the first incident power may include measuring power at a coupled port of a directional coupler that may be coupled to the antenna, and measuring the first reflected power may include measuring power at an isolated port of the directional coupler.

An antenna interface circuit for a wireless communication device according to some embodiments includes a tunable matching circuit and an antenna coupled to the tunable matching circuit. The tunable matching circuit may include a variable impedance element having a variable impedance Ztune. The interface circuit further includes a fixed impedance element having a fixed impedance Zmeas, and a switch coupled to the fixed impedance element and configured to controllably switch the fixed impedance element into electrical communication with the tunable matching circuit.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "wireless terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

For purposes of illustration, embodiments of the present invention are described herein in the context of a wireless terminal. It will be understood, however, that the present invention is not limited to such embodiments and may be embodied generally as an electronic device that includes an antenna for wireless communication.

Figure 1:
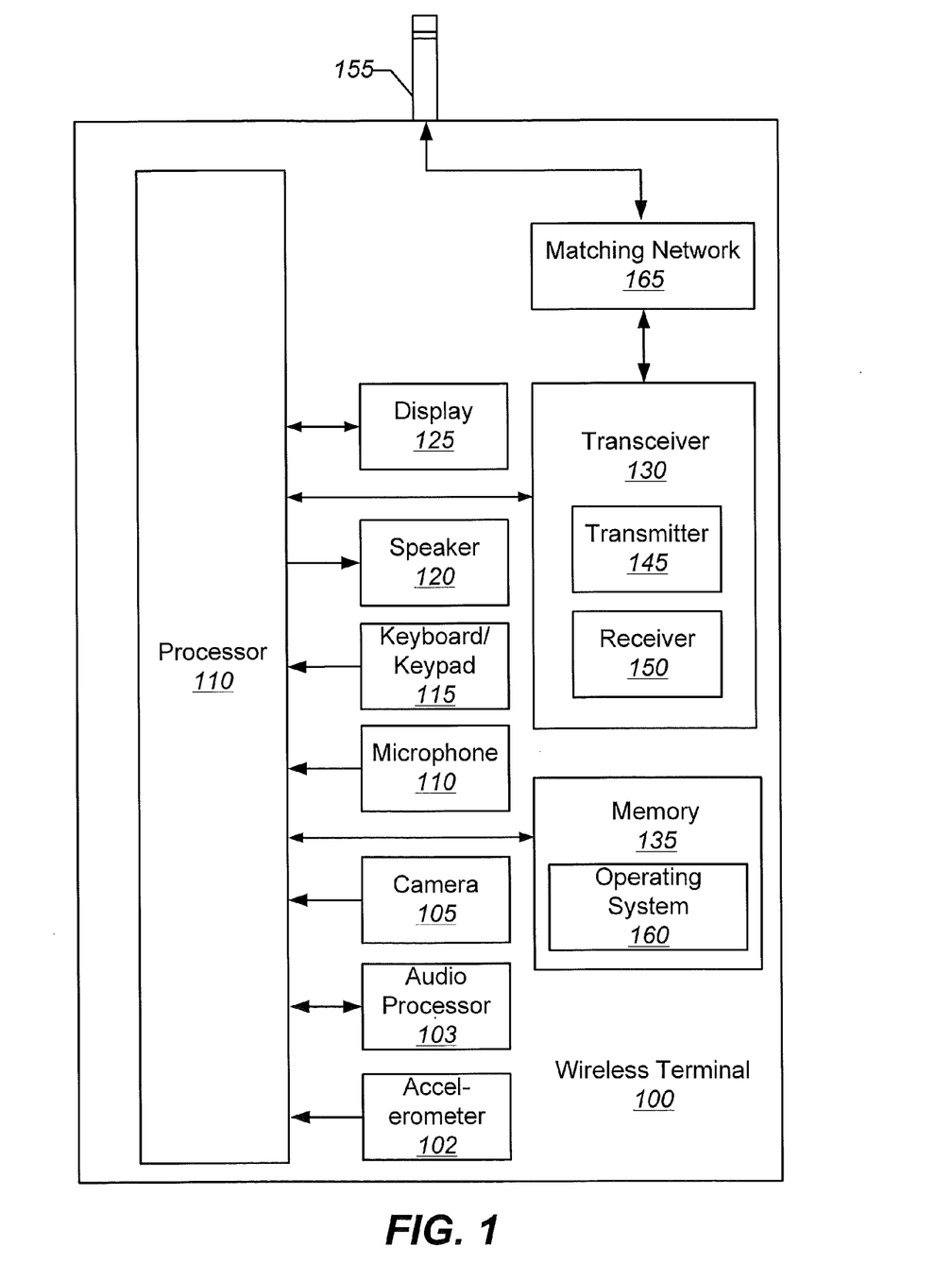
FIG. 1 is a block diagram that illustrates an electronic device/wireless terminal in accordance with some embodiments of the present invention.

Referring now to FIG. 1, a wireless terminal 100, in accordance with some embodiments of the present invention, includes an audio processor 103, a microphone 110, a keyboard/keypad 115, a speaker 120, a transceiver 130, and a memory 135 that communicate with a processor 110. The wireless terminal may optionally include a display 125, a camera 105, and/or an accelerometer unit 102. The transceiver 130 comprises a transmitter circuit 145 and a receiver circuit 150, which respectively transmit outgoing radio frequency signals to remote transceivers and receive incoming radio frequency signals from the remote transceivers via an antenna 155. For wireless telephony, the radio frequency signals transmitted between the wireless terminal 100 and the remote transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. In accordance with various embodiments of the present invention, the wireless terminal 100 may communicate with base station transceivers using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

The foregoing components of the wireless terminal 100 may be included in many conventional wireless terminals and their functionality is generally known to those skilled in the art.

The processor 110 communicates with the memory 135 via an address/data bus. The processor 110 may be, for example, a commercially available or custom microprocessor. The memory 135 is representative of the one or more memory devices containing the software and data used to operate the wireless terminal 100. The memory 135 may include, but is not limited to, the following types of devices: cache, ROM, PROM, EPROM, EEPROM, flash, SRAM, and DRAM.

As shown in FIG. 1, the memory 135 may contain an operating system 160 that generally controls the operation of the wireless terminal 100. In particular, the operating system 165 may manage the wireless terminal's software and/or hardware resources and may coordinate execution of programs by the processor 110.

A tunable matching network 165 couples the antenna 155 to the transceiver 130. In some embodiments, the matching network may be tunable to different impedances so that the impedance of the antenna can be matched to the output impedance of the transceiver as the impedance of the antenna changes due, for example, to changes in the orientation and/or positioning of the antenna. Various embodiments of tunable antenna interface circuits and methods of tuning antenna interface circuits will now be described with reference to FIGS. 2-7C.

Figure 2:
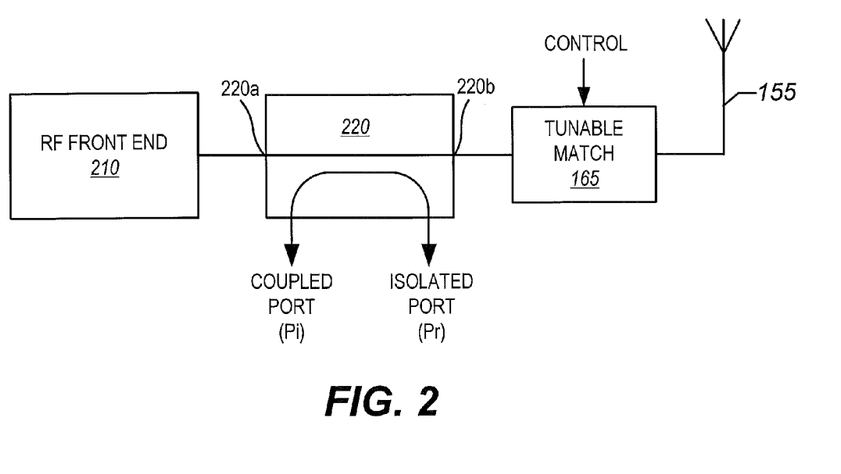
FIG. 2 is a block diagram that illustrates an RF front end with a tunable matching circuit according to some embodiments.

Referring now to FIG. 2 which shows elements of a wireless terminal in more detail, an RF Front end 210 of a transceiver 130 is coupled to the antenna 155 through a directional coupler 220 and tunable matching circuit 165. The directional coupler 210 includes an input port 220a and an output port 220b, along with a coupled port and an isolated port. Power incident on the coupler 220 (Pi) at the input port 220a can be measured at the coupled port, while power reflected from the load (Pr) at the output port 220b can be measured at the isolated port.

The RF front end 210 generally includes everything between the antenna and the digital base band system of the transceiver 130. Such components may include filters, low-noise amplifiers (LNAs), and down-conversion mixer(s) needed to process the modulated signals received at the antenna into signals suitable for input into the base band analog-to-digital converter (ADC), as well as the filters, up-conversion mixers and power amplifiers used to generate a signal to be transmitted over the antenna.

In order to control the tunable matching network, some quantity that describes the current antenna performance may be measured. The simplest way of doing this is by measuring the power that is reflected back from the antenna (Pr) at the isolated port of the directional coupler 220. Since most wireless communication devices already have a directional power coupler at the output of the RF front end, it may be convenient to use the coupler to measure both forward and reverse power for purposes of characterizing the antenna performance.

With this setup it is possible to measure the power incident to the load, Pi, the power reflected from the load, Pr, and from these the power delivered to the load can be calculated as follows:

$$P_{d,watts} = P_{i,watts} - P_{r,watts} \quad (1)$$

That is, the power dissipated in the antenna (Pd) is equal to the power (Pi) that is incident on the antenna and matching network less the power (Pr) that is reflected from the antenna and matching network.

Figure 3:
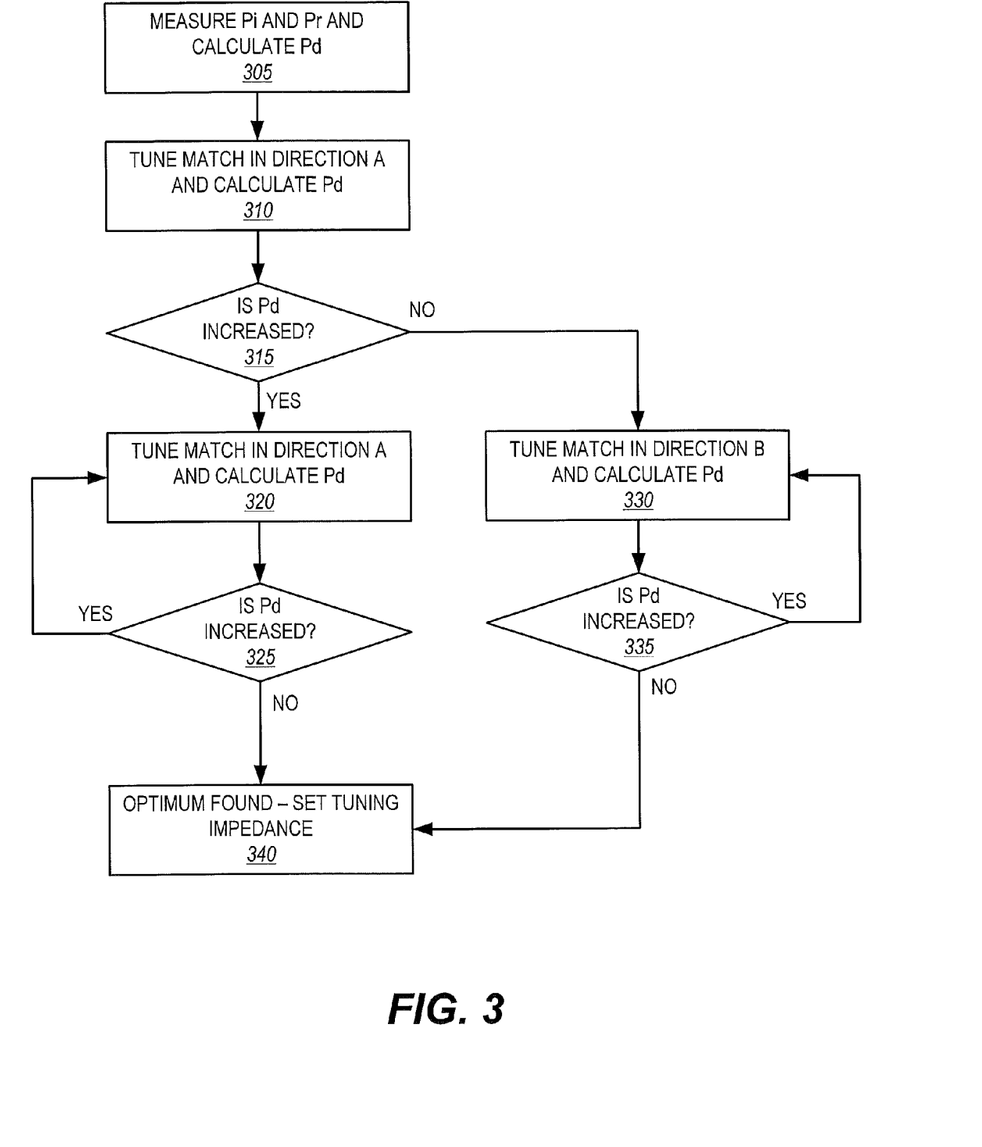
FIG. 3 is a block diagram illustrating tuning of a tunable matching circuit according to some embodiments.

One approach to tuning an antenna matching network, as illustrated in FIG. 3, involves attempting to maximize the power delivered to the load (i.e., the antenna), or attempting to minimize the power reflected from the antenna. In such an approach, a parameter of a tunable matching circuit is iteratively adjusted, either up or down, and the dissipated power is measured until a parameter value that maximizes power dissipation is identified.

Referring to FIG. 3, the incident and reflected power (Pi and Pr) are measured, for example at the coupled and isolated ports of a directional power coupler 220, and the power dissipation Pd is calculated (Block 305). A parameter of the tunable matching network 165, such as the impedance of the network or of a component in the network, is then adjusted in a first direction (e.g., direction A, which may be up or down) (Block 310). The power dissipation Pd is calculated again and compared to the previous calculation. If the power dissipation increases in response to the direction A adjustment, the parameter is again adjusted in direction A, and the power dissipation Pd is again measured/calculated (Block 320). Adjustment in direction A continues until the power dissipation Pd does not increase (e.g., more than a threshold amount) in response to the adjustment, at which point it is assumed that the optimum impedance level has been determined (Block 340).

If in block 315 the power dissipation does not increase in response to the parameter adjustment in direction A, the parameter is adjusted in a second direction (direction B) that may be opposite the first direction (Block 330). The adjustment in direction B continues until the power dissipation Pd does not increase (e.g., more than a threshold amount) in response to the adjustment, at which point it is assumed that the optimum impedance level has been determined (Block 340).

Although straightforward, an approach as illustrated in FIG. 3 may have several drawbacks. For example, the impedance presented to the power amplifier in the RF front end 220 is unknown. Accordingly, there is no way of knowing that the power amplifier passes 3GPP and operator requirements at this load. This method of tuning may be time consuming, and the tuning time is proportional to the accuracy of the tunable match. Furthermore, it may be difficult using this approach to tune with more than one tuning element.

In order to select an impedance for the impedance matching network, it is desirable to know the current antenna impedance. However, it may not be possible to determine a unique value for antenna impedance when only knowing the two parameters Pi and Pr.

Accordingly, some embodiments provide systems, methods and/or apparatus by which an impedance value of an antenna may be measured. An impedance of a tunable matching network can be set so that a combined impedance of the antenna and the matching network has a desired value. For example, the combined impedance of the antenna and the matching network may be about equal to a characteristic impedance of an RF front end of a transceiver.

Referring to Equation (2) below, the reflection coefficient $\Gamma$ of a system can be calculated in terms of the load impedance $Z_L$ and the characteristic impedance $Z_0$ of a source, such as a transmitter, or in terms of the voltage standing wave ratio (VSWR) of the system. In general, a lower reflection coefficient means that more energy is being delivered to the load, while a higher reflection coefficient means that more energy is being reflected from the load.

$$|\Gamma| = \left|\frac{1-VSWR}{1+VSWR}\right| = \left|\frac{Z_L - Z_0}{Z_L + Z_0}\right|, [Z_L = \text{Re}(Z_L) + i \cdot \text{Im}(Z_L)] \quad (2)$$

By combining the expression for the reflection coefficient, $\Gamma$, and the return loss, RL, shown in Equation (3), it is possible to calculate the VSWR as a function of the known parameters Pr and Pi.

$$RL_{dB} = -20 \cdot \log_{20}(|\Gamma|) = P_{r,dB} - P_{i,dB} = \quad (3)$$

$$10 \cdot \log\left(\frac{P_{r,watts}}{P_{i,watts}}\right) \Leftrightarrow |\Gamma| = 10^{-\frac{RL_{dB}}{20}} = \frac{1}{\sqrt{P_{r,watts}/P_{i,watts}}}$$

$$\left|\frac{1-VSWR}{1+VSWR}\right| = \quad (4)$$

$$10^{-\frac{RL_{dB}}{20}} \Leftrightarrow VSWR = \frac{1 + 10^{-\frac{RL_{dB}}{20}}}{1 - 10^{-\frac{RL_{dB}}{20}}} = \frac{1 + \frac{1}{\sqrt{P_{r,watts}/P_{i,watts}}}}{1 - \frac{1}{\sqrt{P_{r,watts}/P_{i,watts}}}}$$

Figure 5A:
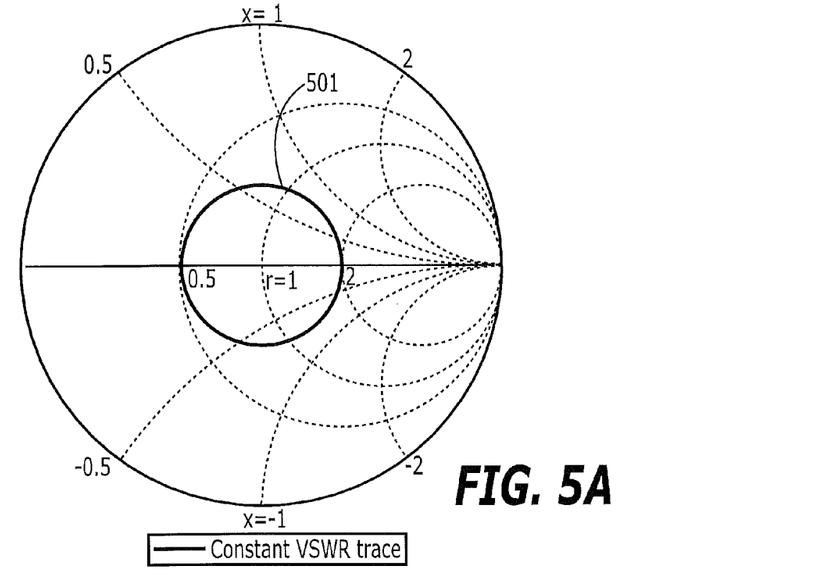
FIGS. 5A and 5B are Smith charts that illustrate VSWR circles that correspond to power dissipation measurements for an electronic device according to some embodiments.

In order to explain the idea visually the Smith chart will be used for the following examples. Referring to FIG. 5A, in the Smith chart, a given VSWR appears as a circle 501 centered at the origin. Note that this is what can be visualized when only measuring Pi and Pr. That is, any load impedance on the circle 501 will result in the same VSWR when power is delivered to the load.

Accordingly, with only Pi and Pr data available, it is only possible to determine that the antenna impedance is somewhere on a particular VSWR circle. It is not possible to tell exactly where on the circle the impedance is located, however. This makes it impossible to calculate the match needed to get the impedance to a desired position.

According to some embodiments, in order to determine the absolute impedance, $Z_L$, currently presented by the antenna 155, a known measurement impedance, Zmeas, is provided, and the incident/reflected power data can be re-taken, thus creating a second VSWR circle. Since the measurement impedance is known, there will be only one $Z_L$ that can generate the new VSWR circle. The actual value of the Zmeas can be characterized accurately over frequency and even temperature and stored in the device 100. The tuning of the antenna will be explained in greater detail below.

The measurement impedance Zmeas that is used to change the VSWR is an impedance that affects the VSWR enough for it to be measurable, but not so much that it severely affects the antenna performance. The measurement impedance Zmeas can be different depending on frequency, and it may include elements connected in series and/or in parallel to the antenna.

Figure 4:
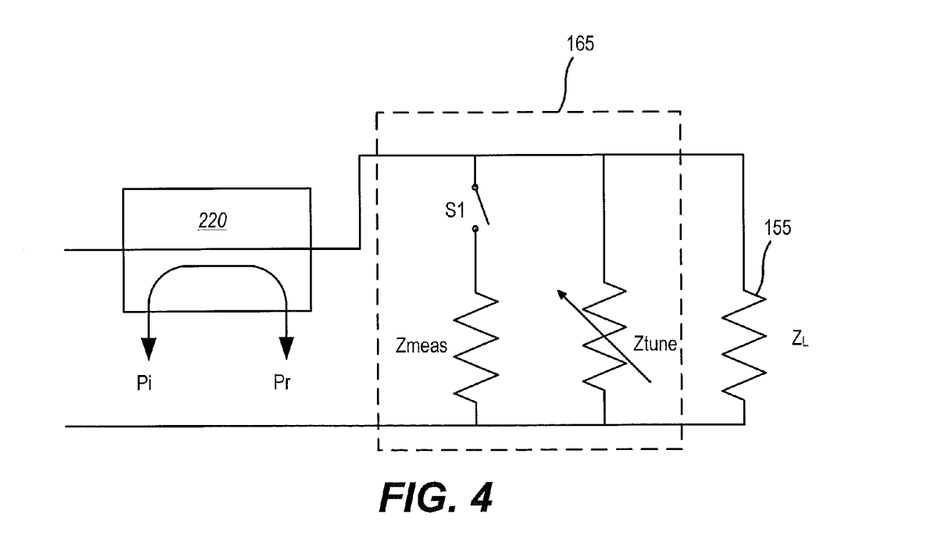
FIG. 4 is a circuit diagram illustrating a tunable matching circuit according to some embodiments.

A tunable matching circuit 165 according to some embodiments is illustrated in FIG. 4. As shown therein, a measurement impedance Zmeas is connected in parallel with the antenna 155 and a tunable impedance Ztune through a series switch S1. The switch S1 can be any kind of switch, and the type of switch is not critical since its performance can be characterized together with the measurement impedance. The switch S1 may be controlled by a switch control signal CONTROL (FIG. 2) that may be generated, for example, by the processor 110 (FIG. 1).

With the switch S1 in an open position and the tunable impedance Ztune set at a high impedance level, the incident and reflected power Pi and Pr may be measured for the antenna 155 alone, resulting in a first VSWR circle 501 as shown in FIG. 5A.

Figure 5B:
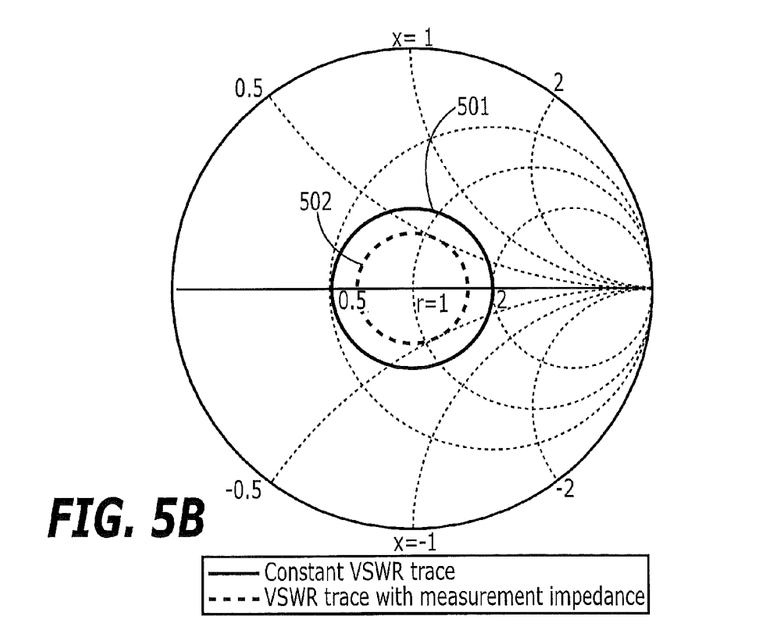

With the switch S1 in a closed position, Pi and Pr may be measured once again and this time a new VSWR circle 502 will be generated, as shown in FIG. 5B.

Since the characteristics of the measurement impedance are known in advance, it is possible to determine exactly where on the initial VSWR trace drawn in the Smith chart the impedance of the antenna 155 is located. This is simply due to the fact that we know which way the measurement impedance would move us in the Smith chart, and there will be only one starting point that together with the measurement impedance will generate the new VSWR circle 502. This means that the complex impedance of the antenna 155 can be described.

From Equation (2) and Equation (3) above, it is possible to create an expression for the antenna impedance ($Z_L$ in Equation (2)). In Equation (5) below, an equation system containing two unknowns, $\text{Re}(Z_L)$ and $\text{Im}(Z_L)$, is presented. All other parameters are known, the $|\Gamma_1|$ and $|\Gamma_2|$ are the calculated reflection coefficients in the cases with and without the measurement impedance Zmeas. $Z_0$ is the characteristic impedance of the system. The characteristic impedance can be 50Ω or any other impedance that the RF front end 220 would like presented. The actual impedance will most likely be determined by the power amplifier in the RF front end 220. The characteristic impedance $Z_0$ could be different depending on the frequency, power or any other factor such as battery voltage or temperature. Solving the equation system presented in Equation (5) will generate the actual impedance of the antenna 155.

$$\begin{cases} |\Gamma_1| = \left|\frac{Z_L - Z_0}{Z_L + Z_0}\right| = \sqrt{\frac{(\text{Re}(Z_L) - \text{Re}(Z_0))^2 + (\text{Im}(Z_L) - \text{Im}(Z_0))^2}{(\text{Re}(Z_L) + \text{Re}(Z_0))^2 + (\text{Im}(Z_L) + \text{Im}(Z_0))^2}} \\ |\Gamma_2| = \left|\frac{Z_L \| Z_{meas} - Z_0}{Z_L \| Z_{meas} + Z_0}\right| = \sqrt{\frac{(\text{Re}(Z_L \| Z_{meas}) - \text{Re}(Z_0))^2 + (\text{Im}(Z_L \| Z_{meas}) - \text{Im}(Z_0))^2}{(\text{Re}(Z_L \| Z_{meas}) + \text{Re}(Z_0))^2 + (\text{Im}(Z_L \| Z_{meas}) + \text{Im}(Z_0))^2}} \end{cases} \quad (5)$$

Once the actual antenna impedance is known, the impedance of the matching network can be chosen so that a combined impedance of the matching network and the antenna matches the impedance of the RF front end 220 if at least a two stage tunable match is used. If a one stage tunable match is used, it will be possible to change the impedance to, for instance, a purely resistive load or to reduce/minimize the VSWR under the given conditions.

In order for systems/methods as described above to work continuously, antenna tuning that is already active needs to be de-embedded from the load impedance before a new matching impedance is calculated. For example, the impedance Ztune in FIG. 4 may be set to a high impedance level.

Figure 6:
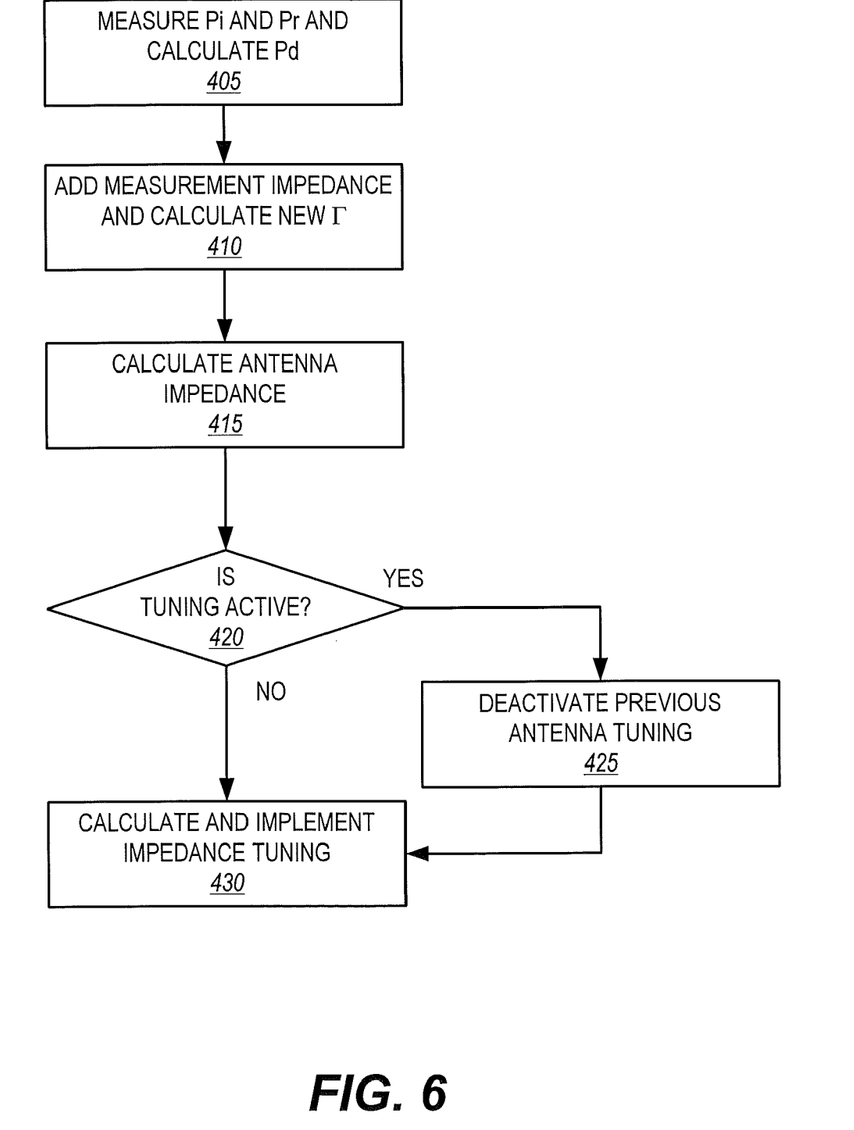
FIG. 6 is a block diagram illustrating tuning of a tunable matching circuit according to further embodiments.

Methods of tuning an antenna according to some embodiments are illustrated in the flowchart of FIG. 6. As shown therein, the incident and reflected power (Pi and Pr) are measured, for example at the coupled and isolated ports of a directional power coupler 220, and the power dissipation Pd is calculated (Block 405). The reflection coefficient $\Gamma_1$ is also calculated at this time. A measurement impedance Zmeas is added to the impedance matching network by activating a switch S1 in response to a switch control signal CONTROL, and a new reflection coefficient $\Gamma_2$ for the system including the measurement impedance is calculated (Block 410). The antenna impedance is then calculated according to Equation (5) (Block 415).

The systems/method then determines if a previously applied tuning is active (Block 420). If so, the previous tuning is deactivated (Block 425). In some cases, it may be possible and/or desirable to deactivate the previous tuning before measuring Pi and Pr without the measurement impedance Zmeas switched into the circuit, although this may result in an undesirable impedance shift that may affect power control and/or modulation performance. A new tuning impedance is then calculated and applied (Block 430).

The tuning process illustrated in FIG. 6 above can either be run continuously, from time to time, or can be triggered by change in the operational mode, orientation or position of the device 100, and/or in response to a change in signaling parameters, such as a change in the transmit frequency and/or in response to a handover. For example, the tuning process may be initiated whenever the device 100 is changed from an open position to a closed position, when the device 100 is changed from a handheld mode to a handsfree mode, when an accelerometer unit 102 (FIG. 1) in the device detects that the position of the device has been changed, or in response to any other change in condition of the device 100.

In the examples discussed above, the measurement impedance has been illustrated as a shunt (parallel) impedance. However, a series measurement impedance could also be used instead of or in addition to the parallel impedance. Similarly, the tunable impedance can include both series and/or parallel elements. In order to ensure sufficient freedom to compensate a range of antenna impedances, one series and one shunt element may be used. Methods of calculating impedance compensation values and the topology and implementation of the tunable matching network are well known to those skilled in the art.

Figure 7A:
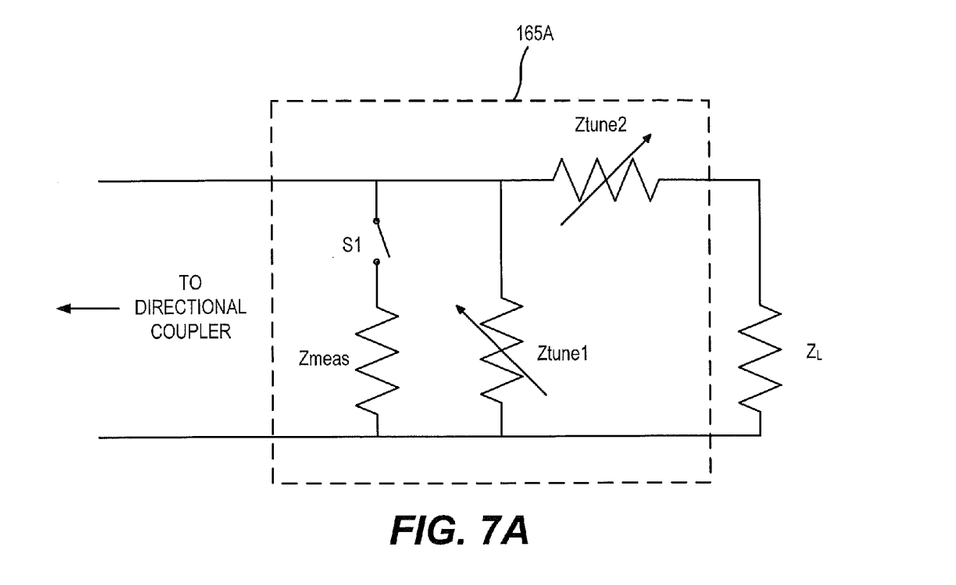
FIGS. 7A-7C are circuit diagrams illustrating tunable matching circuits according to various embodiments.
Figure 7B:
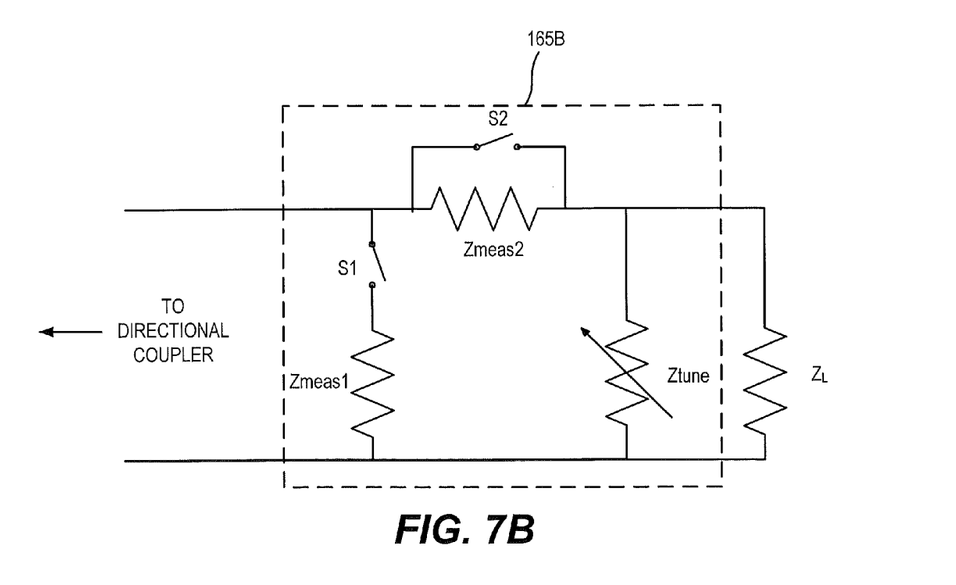
Figure 7C:
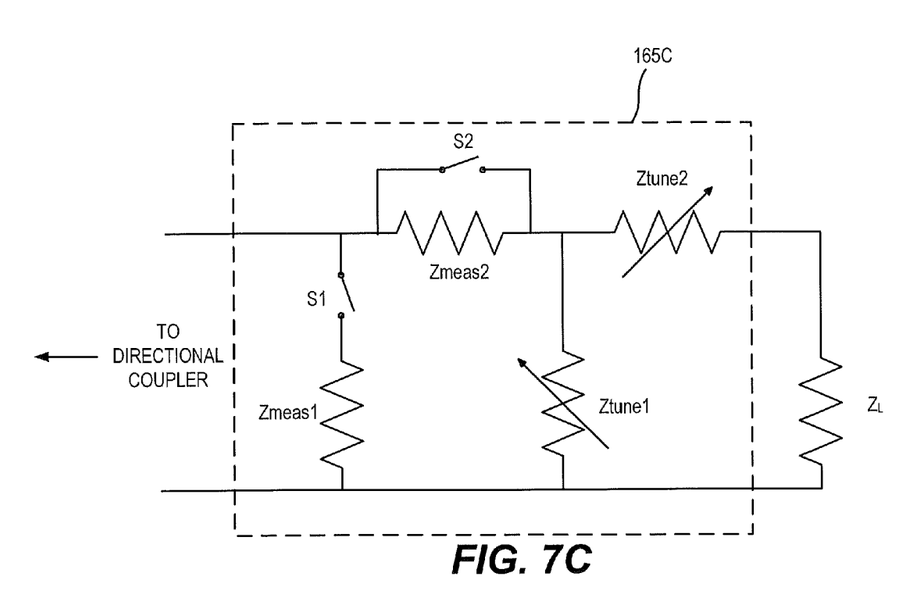

For example, tunable matching circuits according to various embodiments of the invention are illustrated in FIGS. 7A to 7C. The tunable matching circuit 165A illustrated in FIG. 7A includes a first variable impedance element Ztune1 connected in parallel with the antenna impedance $Z_L$, and a second variable impedance element Ztune2 connected in series with the antenna impedance $Z_L$. A measurement impedance Zmeas is connected in parallel with the antenna impedance $Z_L$. In order to deactivate the variable impedance elements, the first variable impedance element Ztune1 may be set to a high impedance level, while the second variable impedance element Ztune2 may be set to a low impedance level.

The tunable matching circuit 165B illustrated in FIG. 7B includes a first measurement impedance element Zmeas1 connected in parallel with the antenna impedance $Z_L$ and activated by a first switch S1 in series with the first measurement impedance element Zmeas1, and a second measurement impedance element Zmeas2 connected in series with the antenna impedance $Z_L$ and activated by a second switch S2 in parallel with the second measurement impedance element Zmeas2. A measurement impedance Zmeas is connected in parallel with the antenna impedance $Z_L$. In order to activate the measurement impedance elements, the first variable switch S1 may be closed, while the second switch S2 may be opened.

The tunable matching circuit 165C illustrated in FIG. 7C includes both parallel and series measurement impedance elements Zmeas1 and Zmeas2, and both parallel and series tunable impedance elements Ztune1 and Ztune2. The examples discussed above are illustrative only, and other configurations are possible for the tunable matching network.

Many variations and modifications can be made to the embodiments without substantially departing from the principles of the present invention. All such variations and modifications are intended to be included herein within the scope of the present invention, as set forth in the following claims.

That which is claimed is:

1. A wireless communication device, comprising:
   a power coupler coupled to a signal output port of an RF communication unit;
   a tunable matching circuit coupled to the power coupler and including a variable impedance element having a variable impedance Ztune;
   a fixed impedance element having a fixed impedance Zmeas; and
   a switch coupled to the fixed impedance element and configured to controllably switch the fixed impedance element into electrical communication with the power coupler and the tunable matching circuit.

2. The wireless communication device of claim 1, further comprising an antenna coupled to the tunable matching circuit.

3. The wireless communication device of claim 2, wherein the variable impedance element is coupled in parallel with the antenna.

4. The wireless communication device of claim 2, wherein the variable impedance element is coupled in series with the antenna.

5. The wireless communication device of claim 2, wherein the fixed impedance element is coupled in parallel with the antenna.

6. The wireless communication device of claim 5, wherein the switch is coupled in series with the fixed impedance element.

7. The wireless communication device of claim 2, wherein the fixed impedance element is coupled in series with the antenna.

8. The wireless communication device of claim 7, wherein the switch is coupled in parallel with the fixed impedance element.

9. The wireless communication device of claim 2, wherein the variable impedance element comprises a first variable impedance element coupled in parallel with the antenna and a second variable impedance element coupled in series with the antenna.

10. The wireless communication device of claim 1, wherein the RF communication unit comprises a transceiver.

11. The wireless communication device of claim 1, wherein the power coupler comprises an input port, an output port, a coupled port and an isolated port, wherein forward power is present at the coupled port and reflected power is present at the isolated port.

12. A method of tuning an antenna matching circuit in a wireless communication device including an RF communication unit and an antenna, the method comprising:
   measuring first incident power to the antenna and first reflected power from the antenna in response to an output signal applied to the antenna;
   coupling a fixed impedance element to the antenna;
   measuring second incident power to the antenna and second reflected power from the fixed impedance element and the antenna in response to an output signal applied to the fixed impedance element and the antenna;
   determining an impedance associated with the antenna in response to the first and second incident and reflected power measurements; and
   coupling a variable impedance element to the antenna, the variable impedance element having an impedance selected in response to the impedance associated with the antenna.

13. The method of claim 12, wherein a combined impedance of the variable impedance element and the antenna present a predetermined output impedance to the RF communication unit.

14. The method of claim 12, wherein determining an impedance associated with the antenna in response to the first and second incident and reflected power measurements comprises generating a first reflection coefficient in response to the first incident power and the first reflected power, generating a second reflection coefficient in response to the second incident power and the second reflected power, and determining the impedance associated with the antenna in response to the first and second reflection coefficients.

15. The method of claim 14, wherein the impedance associated with the antenna is calculated according to the following equation:

$$\begin{cases} |\Gamma_1| = \left|\dfrac{Z_L - Z_0}{Z_L + Z_0}\right| = \sqrt{\dfrac{(\text{Re}(Z_L) - \text{Re}(Z_0))^2 + (\text{Im}(Z_L) - \text{Im}(Z_0))^2}{(\text{Re}(Z_L) + \text{Re}(Z_0))^2 + (\text{Im}(Z_L) + \text{Im}(Z_0))^2}} \\ |\Gamma_2| = \left|\dfrac{Z_L \| Z_{meas} - Z_0}{Z_L \| Z_{meas} + Z_0}\right| = \sqrt{\dfrac{(\text{Re}(Z_L \| Z_{meas}) - \text{Re}(Z_0))^2 + (\text{Im}(Z_L \| Z_{meas}) - \text{Im}(Z_0))^2}{(\text{Re}(Z_L \| Z_{meas}) + \text{Re}(Z_0))^2 + (\text{Im}(Z_L \| Z_{meas}) + \text{Im}(Z_0))^2}} \end{cases}$$

wherein $Z_L$ represents the antenna impedance, $Z_0$ represents a characteristic impedance of the RF communication unit, Zmeas represents the impedance of the fixed impedance element, $\Gamma_1$ represents the first reflection coefficient and $\Gamma_2$ represents the second reflection coefficient.

16. The method of claim 12, further comprising determining if a previous impedance tuning is active and responsively deactivating the previous impedance tuning before coupling the variable impedance element to the antenna.

17. The method of claim 12, wherein measuring the first incident power comprises measuring power at a coupled port of a directional coupler that is coupled to the antenna, and wherein measuring the first reflected power comprises measuring power at an isolated port of the directional coupler.

18. An antenna interface circuit for a wireless communication device including an antenna, the circuit comprising:
a tunable matching circuit coupled to the antenna, wherein the tunable matching circuit comprises a variable impedance element having a variable impedance Ztune;
a fixed impedance element having a fixed impedance Zmeas; and
a switch coupled to the fixed impedance element and configured to controllably switch the fixed impedance element into electrical communication with the tunable matching circuit.

19. The antenna interface circuit of claim 18, wherein the variable impedance element comprises a first variable impedance element coupled in parallel with the antenna and a second variable impedance element coupled in series with the antenna.

20. The antenna interface circuit of claim 18, wherein the fixed impedance element comprises a first fixed impedance element coupled in parallel with the antenna and a second fixed impedance element coupled in series with the antenna.

* * * * *